United States Patent [19]

Boeckh et al.

[11] Patent Number: 5,635,554
[45] Date of Patent: Jun. 3, 1997

[54] LOW VISCOSITY MIXTURES OF AMPHIPHILIC NONIONIC GRAFT COPOLYMERS AND VISCOSITY-REDUCING ADDITIVES

[75] Inventors: Dieter Boeckh; Hans-Peter Seelmann-Eggebert, both of Limburgerhof; Hans-Ulrich Jäger, Neustadt; Rolf-Dieter Kahl, Hassloch; Gunnar Schornick, Neuleiningen, all of Germany

[73] Assignee: BASF Aktiengesellschaft, Ludwigshafen, Germany

[21] Appl. No.: 501,340

[22] Filed: Jul. 12, 1995

[30] Foreign Application Priority Data

Jul. 14, 1994 [DE] Germany ............... 44 24 818.0

[51] Int. Cl.$^6$ ................ C11D 1/00; C11D 1/66
[52] U.S. Cl. ................ 524/377; 524/366; 510/535; 510/340; 510/434
[58] Field of Search ............... 252/174.21, 174.24, 252/174.23, 95, 99, 135, DIG. 2; 524/322, 504, 376, 377, 366, 56, 158, 156, 157; 523/436; 528/271; 525/404

[56] References Cited

U.S. PATENT DOCUMENTS

| | | | |
|---|---|---|---|
| 4,999,869 | 3/1991 | Holland et al. | 252/174.21 |
| 5,420,211 | 5/1995 | Hughes et al. | 252/174.24 |

FOREIGN PATENT DOCUMENTS

| | | |
|---|---|---|
| 219048 | 5/1988 | European Pat. Off. |
| 0285935 | 10/1988 | European Pat. Off. |
| 285935 | 7/1989 | European Pat. Off. |
| 286019 | 7/1989 | European Pat. Off. |
| 342887 | 11/1989 | European Pat. Off. |
| 0358474 | 3/1990 | European Pat. Off. |
| 3711299 | 10/1988 | Germany. |
| 3711298 | 7/1989 | Germany. |

*Primary Examiner*—Tae Yoon
*Attorney, Agent, or Firm*—Oblon, Spivak, McClelland, Maier & Neustadt, P.C.

[57] ABSTRACT

Low viscosity mixtures of (I) from 40 to 97.5% by weight of amphiphilic nonionic graft copolymers comprising, in copolymerized form,
  (a) at least 20% by weight of polyalkylene oxide units or polyvinylpyrrolidone units as hydrophilic part of the molecule and
  (b) at least 40% by weight of vinyl ester and/or (meth) acrylic ester units as hydrophobic part of the molecule, and (II) from 2.5 to 60% by weight of at least one viscosity-reducing additive selected from the group consisting of polyalkylene glycols, alkoxylated alcohols, alkoxylated alkylphenols, alkoxylated amines and hydroxy compounds having from 1 to 4 OH groups and from 2 to 10 carbon atoms, the molecular mass $M_N$ of the polymers in each case being not more than 2500, and (III) from 0 to 40% by weight of homogenizing or phase-stabilizing additives, for example water, monobasic and dibasic carboxylic acids having from 8 to 25 carbon atoms, fatty alcohol sulfates and fatty alcohol sulfonates or mixtures thereof, are useful as detergent and cleaner additives.

9 Claims, No Drawings

LOW VISCOSITY MIXTURES OF AMPHIPHILIC NONIONIC GRAFT COPOLYMERS AND VISCOSITY-REDUCING ADDITIVES

The present invention relates to low viscosity mixtures of amphiphilic nonionic graft copolymers containing in copolymerized form (a) at least 20% by weight of polyalkylene oxide units or polyvinylpyrrolidone units as hydrophilic part of the molecule and (b) at least 40% by weight of vinyl ester and/or (meth) acrylic ester units as hydrophobic part of the molecule with at least one viscosity-reducing additive. These mixtures are used as additament in the production of detergents and cleaners.

Amphiphilic nonionic graft copolymers, which are prepared for example by free-radically initiated graft copolymerization in the melt, are high viscosity resins which, even at temperatures up to 60° C., are frequently so viscous that no free flow is observed. The high viscosity of the graft copolymers presents a problem for use in industry, since these polymers can only be processed at relatively high temperatures. Amphiphilic nonionic graft copolymers are known for example from EP-B-0 219 048. They are prepared for example by grafting (a) polyalkylene oxides having a number average molecular weight from 2000 to 100,000 and based on ethylene oxide, propylene oxide and/or butylene oxide with (b) vinyl acetate in a weight ratio of (a) : (b) of from 1: 0.2 to 1: 10. The vinyl acetate groups in the copolymer may if desired be hydrolyzed up to 15%. The copolymers are used as grayness inhibitors in the wash of synthetic fiber textile material.

EP-B--0 285 935 discloses the use as grayness inhibitors in the wash or aftertreatment of synthetic fiber textile material of graft polymers prepared by free-radically copolymerizing (a) polyalkylene oxides having a number average molecular weight from 300 to 100,000 based on ethylene oxide, propylene oxide 40 and/or butylene oxide with (b) at least one vinyl ester of a saturated monocarboxylic acid containing from 3 to 6 carbon atoms, methyl acrylate, ethyl acrylate, methyl methacrylate and/or ethyl methacrylate and 45 also optionally mixtures of one of the monomers mentioned and up to 95% by weight of acetate, in a weight ratio of (a) z (b) of from 1: 0.2 to 1: 10.

DE-A--37 11 298 discloses the use as grayness inhibitors in the wash and aftertreatment of synthetic fiber textile materials of amphiphilic nonionic graft copolymers obtainable by free-radically copolymerizing (a) at least singly end-capped polyalkylene oxides having a number average molecular weight from 300 to 100,000 and based on ethylene oxide, propylene oxide and/or butylene oxide with (b) at least one vinyl ester of a saturated monocarboxylic acid containing from 1 to 6 carbon atoms and/or a methyl or ethyl ester of acrylic or methacrylic acid in a weight ratio of (a) : (b) of from 1: 0.2 to 1: 10.

DE-A--37 11 299 discloses using graft copolymers obtainable by grafting (a) polyvinylpyrrolidone having a viscosity average molecular weight from 500 to 150,000 with (b) at least one vinyl ester of a saturated monocarboxylic acid containing from 1 to 6 carbon atoms and/or methyl or ethyl (meth)acrylate in a weight ratio of (a) : (b) of from 1: 0.5 to 1: 10 as grayness inhibitors in the wash and aftertreatment of synthetic fiber textile material.

EP-B-0 286 019 discloses the use of graft polymers based on polyesters, polyesterurethanes and polyesteramides as grayness inhibitors in detergents. The grafting base polyesters, polyesterurethanes and polyesteramides contain polyalkylene oxide units as amphiphilic moiety. The hydrophobic graft comprises units of vinyl esters of saturated $C_1$- to $C_6$-carboxylic acids and/ or acrylic and/or methacrylic esters of saturated monohydric alcohols containing from 1 to 4 carbon atoms.

EP-A 0 342 887 discloses mixtures of anionic block copolymers and viscosity-reducing additives. Suitable viscosity-reducing additives are for example fatty acids having from 8 to 22 carbon atoms, addition products of ethylene oxide with alkylphenols, fatty alcohols and fatty acids, polyalkylene glycols and dialkyl ethers of ethylene glycol. Such mixtures, being less viscous than the block copolymers, are technically more suitable for producing detergent formulations.

It is an object of the present invention to provide low viscosity mixtures of amphiphilic nonionic graft copolymers suitable for use in detergents and cleaners without adversely affecting the detersive properties of the polymers or of the detergent and cleaner formulations.

This object is achieved according to the present invention by low viscosity mixtures of (I) from 40 to 97.5% by weight of amphiphilic nonionic graft copolymers comprising, in copolymerized form,
  (a) at least 20% by weight of polyalkylene oxide units or polyvinylpyrrolidone units as hydrophilic part of molecule and
  (b) at least 40% by weight of vinyl ester and/or (meth) acrylic ester units as hydrophobic part of the molecule, and (II) from 2.5 to 60% by weight of at least one viscosity-reducing additive selected from the group consisting of polyalkylene glycols, alkoxylated alcohols, alkoxylated alkylphenols, alkoxylated amines and hydroxy compounds having from 1 to 4 OH groups and from 2 to 10 carbon atoms, the molecular mass $M_N$ of the polymers in each case being not more than 2500, and (III) from 0 to 40% by weight of homogenizing or phase-stabilizing additives selected from the group consisting of
  (a) water,
  (b) monobasic and dibasic carboxylic acids having from 8 to 25 carbon atoms, fatty alcohol sulfates, fatty alcohol sulfonates, alkylbenzenesulfonates, sulfonation and/or sulfation products of alkoxylated alcohols having from 8 to 22 carbon atoms or alkylphenols, alkyl(poly)glucosides having from 1 to 20 carbon atoms in the alkyl group, mono-, oligo- and polysaccharides and the oxidation or reduction derivatives thereof, and
  (c) mixtures of (a) and (b) in a weight ratio of from 100: 1 to 20: 80.

Preference is given to low viscosity phase-stable mixtures of (I) from 50 to 90% by weight of amphiphilic nonionic graft copolymers comprising, in copolymerized form,
  (a) at least 20% by weight of polyalkylene oxide units as hydrophilic part of the molecule and
  (b) at least 40% by weight of vinyl ester and/or acrylic ester units as hydrophobic part of the molecule, (II) from 5 to 48% by weight of at least one viscosity-reducing additive selected from the group consisting of polyalkylene glycols, alkoxylated alcohols, alkoxylated amines and hydroxy compounds having from 1 to 4 OH groups and from 2 to 10 carbon atoms, the molecular mass $M_N$ of the polymers in each case being not more than 2500, and (III) from 2 to 20% by weight of water having a viscosity less than 5000 mPas at 60° C.

The amphiphilic nonionic graft copolymers suitable for use as components (I) are known from the above-cited references, for example EP-B--0 219 048, EP--B--0 285 935, DE--A--37 11 298 and DE-A--37 11 299. The amphiphilic nonionic graft copolymers described therein comprise in the form of copolymerized units (a) at least 20, preferably from 25 to 50, % by weight of polyalkylene oxide units or polyvinylpyrrolidone units as hydrophilic part of the molecule and (b) at least 40, preferably from 50 to 75, % by weight of vinyl ester and/or (meth)acrylic ester units as hydrophobic part of the molecule.

The amphiphilic nonionic graft copolymers (I) are preferably prepared by free-radically initiated graft copolymerization of (a) polymers containing alkylene oxide or vinylpyrrolidone units as grafting base with (b) vinyl and/or (meth)acrylic esters in a solvent-free melt or in the presence of not more than 20% by weight, preferably not more than 10% by weight, of a solvent.

Such graft copolymers usually have very high viscosities which even at 50° C. may still be above 50,000 mPas. The grafting base (a) of the amphiphilic nonionic graft copolymers comprises polyalkylene oxides having a number average molecular weight from 2000 to 100,000 and based on ethylene oxide, propylene oxide and/or butylene oxide. The grafting base forms the hydrophilic part of the amphiphilic nonionic graft copolymer. Preference is given to using polyethylene oxides or block copolymers of ethylene oxide and propylene oxide and optionally butylene oxide or block copolymers of ethylene oxide and butylene oxide. The alkylene oxide units can also be present in component (a) in random distribution. The polyalkylene oxides may if desired be singly or doubly capped, for example esterified with $C_1$- to $C_8$-carboxylic acids or etherified with $C_1$- to $C_{18}$-alkyl, at the end group(s). The grafting base (a) is grafted with vinyl esters of saturated $C_1$- to $C_6$-carboxylic acids and/or acrylic and methacrylic esters of $C_1$- to $C_4$-alcohols, preferably monohydric $C_1$- to $C_4$-alcohols, under the action of free-radical polymerization initiators. The preferred monomers (b) are vinyl formate, vinyl acetate, methyl acrylate, ethyl acrylate and methyl methacrylate. The weight ratio of component (a) to component (b) ranges from 1: 0.2 to 1: 10, preferably from 1: 0.5 to 1: 6. The graft copolymers have for example a Fikentscher K value of from 15 to 45 (determined in 1% strength by weight solution in ethyl acetate at 25° C.).

Suitable for use as the grafting base (a) are also polyvinylpyrrolidones having a viscosity average molecular weight from 500 to 150,000. The K values of the graft copolymers obtainable therefrom with vinyl esters and (meth)acrylic esters are likewise within the range specified above for the graft copolymers on polyalkylene oxides.

The amphiphilic nonionic graft copolymers of group (I) are present in the mixtures in an amount from 40 to 97.5, preferably from 50 to 90, % by weight.

The mixtures of the present invention contain as component (II) from 2.5 to 60, preferably from 5 to 48, % by weight of at least one viscosity-reducing additive suitable additives of this kind are described for example in EP-A--0 342 887.

These compounds are preferably polyalkylene glycols, alkoxylated alcohols, alkoxylated alkylphenols, alkoxylated amines and hydroxy compounds having from 1 to 4 OH groups and from 2 to 10 carbon atoms. The number average molecular mass of the polymers is in each case not more than 2500.

Suitable polyalkylene glycols include for example polymers of ethylene oxide, propylene oxide and/or butylene oxide. Individual compounds of this kind include for example diethylene glycol, triethylene glycol, tetraethylene glycol, dipropylene glycol, tripropylene glycol, block copolymers of ethylene oxide and propylene oxide, block copolymers of ethylene oxide, propylene oxide and butylene oxide, block copolymers of ethylene oxide and butylene oxide and also random copolymers of ethylene oxide, propylene oxide and/or butylene oxide. Suitable alkoxylated alcohols include for example the reaction products of $C_1$- to $C_{22}$-alcohols with ethylene oxide, propylene oxide and/or butylene oxide. Alkoxylated alcohols having from 8 to 22 carbon atoms are especially suitable. These alcohols can be alkoxylated with ethylene oxide and/or propylene oxide. The alkoxylated alcohols may also if desired be capped, ie. the terminal OH group may be etherified or esterified. Also suitable for use as viscosity-reducing additives are alkoxylated alkylphenols. Products of this kind are known. They are prepared for example by reacting $C_1$- to $C_{18}$-alkylphenols with from 2 to 60 mol of an alkylene oxide or a mixture of alkylene oxides. The most suitable alkylene oxides are ethylene oxide and/or propylene oxide. Suitable alkoxylated amines are obtained for example by alkoxylating $C_1$- to $C_{22}$-alkylamines, ethylenediamine, diethylenetriamine or other polyamines. In some cases it has proved advantageous to use as component (II) alkoxylated amines obtained by reacting mono- or diamines with ethylene oxide and subsequently propylene oxide, the molar ratio in the addition product of ethylene oxide to propylene oxide units being within the range from 1: 4 to 1: 20. The number average molecular weights of the polymers are not more than 2500 and are preferably within the range from 106 to 1600.

For them to be used in detergents, it is crucial that the mixtures of the present invention do not cause any deterioration in the detersive and ecological properties of the detergents obtained therewith. Preference is accordingly given to the use of such mixtures of low viscosity whose components II or III can remain in the detergent formulation without causing any deterioration in the detersive properties. The mixtures of the invention are preferably used in the production of textile detergents in such amounts that detergent formulations are formed which contain component I of the mixtures of the invention in active amounts, e.g. 0.1 to 10 wt.%.

Further suitable viscosity-reducing additives (II) are hydroxy compounds having from 1 to 4 OH groups and from 2 to 10 carbon atoms in the molecule. Examples thereof are ethylene glycol, propylene glycol, ethanol, isopropanol, n-propanol, n-butanol, isobutanol, glycerol and pentaerythritol.

The mixtures of the present invention may comprise as component (III) from 0 to 40% by weight of homogenizing or phase-stabilizing additives. Such additives are for example (a) water, (b) monobasic and dibasic carboxylic acids having from 8 to 25 carbon atoms, fatty alcohol sulfates, fatty alcohol sulfonates, alkylbenzenesulfonates, sulfonation and/or sulfation products of alkoxylated alcohols having from 8 to 22 carbon atoms or alkylphenols, alkyl (poly)glucosides having from 1 to 20 carbon atoms in the alkyl group, mono-, oligo- and polysaccharides and the oxidation or reduction derivatives thereof, and (c) mixtures of (a) and (b) in a weight ratio of from 100: 1 to 20 : 80.

The preferred component (III) is water. If homogenizing or phase-stabilizing additives are present in the mixtures, the amounts used thereof preferably range from 2 to 20% by weight, based on the mixtures.

The mixtures of the components (I), (II) and optionally (III) are prepared for example by heating the polymers of component (i) to form a melt and admixing the components (II) and optionally (III) at temperatures within the range from for example 50° to 100° C. These components can be added all at once, a little at a time or in the form of a continuous metered addition. The mixtures of the present invention have distinctly lower viscosities than the polymers (I) and also distinctly lower viscosities than mixtures of the polymers (I) and water at a polymer content which is comparable to that of the mixtures according to the present invention. Particularly preferred alkoxylated compounds suitable for use in detergents and cleaners are ethoxylation products of preferably linear aliphatic $C_8$- to $C_{22}$-alcohols. Given a choice of suitable combinations of the constituents (I), (II) and optionally (III), the mixtures of the present invention are preferably obtainable in monophasic form. It is true that a monophasic mixture is not achievable in every case, but the mixtures are none the less stable to ensure homogeneous incorporation into detergent formulations. The mixtures of the present invention have a viscosity at 60° C. of not more than 15000, preferably not more than 5000, mPas.

The mixtures of the present invention, which have a reduced viscosity compared with the pure polymers and compared with mixtures of the polymers and water, are usable for all applications which are known from the literature for the amphiphilic nonionic graft copolymers, namely as additament in the production of detergents and cleaners. Such formulations have grayness-inhibiting and soil-dispersing properties, and the detergents are phosphate-free or have a reduced phosphate content of less than 25% by weight, calculated as trisodium phosphate. The mixtures of the present invention are also suitable for use as de-inking process aids.

For example, the viscosity of a graft copolymer of vinyl acetate on a polyethylene glycol of molecular mass 6000 decreases on mixing with water only from 200,000 mPas to about 90,000 mPas and rises in the case of mixtures with more than 25% by weight of water to above the viscosity of the pure polymer.

The percentages in the Examples are by weight. The K values were measured by the method of H. Fikentscher, Cellulose-Chemie 13 (1932), 58–64, 71–74, in 1% strength solution in methyl acetate at 25° C. The viscosities were determined at 50° C using a cone and plate viscometer.

Examples

Graft copolymer A: Prepared by the method indicated in EP-B-0 219 048 by free-radically initated grafting of vinyl acetate onto a polyethylene oxide of molecular mass 6000 (number average) in a weight ratio of 1.6: 1 in a solvent-free melt.

The graft copolymer had a K value of 21.8 and a viscosity of 203 000 mPas at 50° 1 C.

Examples 1 to 10

The graft polymer A was heated to 80° C. and homogeneously mixed with the components (II) and (III) indicated in the table. The mixtures were monophasic and had the viscosities reported in the table at 50° C.

TABLE

| Ex. No. | Graft co-polymer A [% by wt.] | Component (II) [% by weight] | Component (III) water [% by wt.] | Viscosity of mixture [mPas] at 50° C. |
|---|---|---|---|---|
| 1 | 70 | Ethylene glycol | 15 | 15 | 40,000 |
| 2 | 70 | Triethylene glycol | 15 | 15 | 23,000 |
| 3 | 60 | Diethylene glycol | 20 | 20 | 28,000 |
| 4 | 60 | Diethylene glycol | 36 | 4 | 2,800 |
| 5 | 70 | Diethylene glycol | 28 | 9 | 8,200 |
| 6 | 80 | Diethylene glycol | 21 | 6 | 13,000 |
| 7 | 70 | $C_{13/15}EO_7$(*) | 14 | 15 | 10,500 |
| 8 | 70 | Propylene glycol | 15 | 15 | 6,400 |
| 9 | 70 | Tripropylene glycol | 15 | 15 | 4,600 |
| 10 | 80 | Isopropanol | 10 | 10 | 3,290 |

(*)$C_{13}$–$C_{15}$ oxo alcohol ethoxylated with 7 mol of ethylene oxide

The grayness-inhibiting effect of the mixtures of Examples 1 to 10 was tested as follows:

Test fabrics were subjected to 3 successive washes together with a standard soil cloth. The soil cloth was renewed after every wash, and the test fabric became more and more soiled after every wash. The whiteness of the test fabric after the 3rd wash was used to assess the degree of soiling. The photometric measurement of the reflectance in percent was carried out in the present case using an Elrepho (Datacolor) at a wavelength of 460 nm (barium primary white standard to DIN 5033). The test detergent used had the following composition:

| Test detergent | |
|---|---|
| Sodium $C_{10}$–$C_{13}$-alkylbenzenesulfonate | 6% |
| $C_{13}$–$C_{15}$ Fatty alcohol ethoxylated with 7 mol of ethylene oxide per mole of fatty alcohol | 5% |
| Soap | 3% |
| Zeolite A | 30% |
| Sodium metasilicate x5H$_2$O | 5% |
| Sodium carbonate | 7.5% |
| Polymer (active substance) | 1.0% |

The formulation was made up to 100% with the calculated amount of H$_2$O.

| Test conditions | |
|---|---|
| Test apparatus | Launder-O-meter |
| Water hardness | 16° German hardness |
| Liquor ratio | 12.5:1 |
| Wash temperature | 60° C. |
| Wash time | 30 min |
| Detergent concentration | 6 g/l |
| Test fabrics | 5 g of cotton, 2.5 g of polyester-cotton, 2.5 g of polyester (standard soil cloths from Wäscherei-forschungsanstalt Krefeld) |

The table below shows the increase in the reflectance of polyester fabric on addition of 1% of polymer (active substance) from the mixtures of the present invention.

| Example | Comparative Example | Polymer | Reflectance |
|---|---|---|---|
| — | 1 | none | 54.5 |
| — | 2 | graft copolymer (100%) | 70.9 |
| 11 | — | 1 | 71.8 |
| 12 | — | 2 | 71.2 |
| 13 | — | 3 | 69.5 |
| 14 | — | 4 | 70.5 |
| 15 | — | 5 | 70.8 |
| 16 | — | 6 | 69.8 |
| 17 | — | 7 | 68.1 |
| 18 | — | 8 | 70.6 |
| 19 | — | 9 | 70.3 |
| 20 | — | 10 | 71.6 |

The foregoing examples show that the mixtures of the present invention bring about the same grayness-inhibiting effect as the pure polymer.

We claim:

1. A low viscosity mixture of
   (I) from 40 to 95% by weight of amphiphilic nonionic graft copolymers comprising, in copolymerized form,
      (a) at least 20% by weight of polyalkylene oxide units or polyvinylpyrrolidone units as hydrophilic part of the molecule and
      (b) at least 40% by weight of vinyl ester and/or (meth) acrylic ester units as hydrophobic part of the molecule, and
   (II) from 5 to 60% by weight of at least one viscosity-reducing additive selected from the group consisting of alkyloxylated alcohols having from 8 to 22 carbon atoms, alkoxylated alkylphenols and alkoxylated amines, the molecular mass $M_N$ in each case being not more than 2500, and
   (III) from 0 to 40% by weight of water as homogenizing or phase-stabilizing additive said weight percentages being based on the mixture.

2. A low viscosity phase-stable mixture of
   (I) from 50 to 90% by weight of amphiphilic nonionic graft copolymers comprising, in copolymerized form,
      (a) at least 20% by weight of polyalkylene oxide units as hydrophilic part of the molecule and
      (b) at least 40% by weight of vinyl ester and/or acrylic ester units as hydrophobic part of the molecule,
   (II) from 5 to 48% by weight of at least one viscosity-reducing additive selected from the group consisting of alkoxylated alcohols having from 8 to 22 carbon atoms and alkoxylated amines, the molecular mass $M_N$ in each case being not more than 2500, and
   (III) from 2 to 20% by weight of water having a viscosity less than 5000 mPas at 60° C. said weight percentages being based on the mixture.

3. The low viscosity mixture as claimed in claim 1, wherein the viscosity-reducing additive (II) comprises the reaction products of 1 mol of a monohydric $C_8$- to $C_{22}$-alcohol with from 2 to 70 mol of ethylene oxide and from 0 to 30 mol of propylene oxide.

4. A low viscosity mixture of
   (I) from 40 to 95% by weight of amphiphilic nonionic graft copolymers comprising, in copolymerized form,
      (a) at least 20% by weight of a polyalkylene oxide grafting base having a number average molecular weight of from 2,000 to 100,000 based on ethylene oxide, propylene oxide, butylene oxide or mixtures thereof as hydrophilic part of the molecule, and
      (b) at least 40% by weight of vinyl-formate, vinyl acetate, methyl acrylate, ethyl acrylate or methyl methacrylate as hydrophobic grafted part of the molecule, and
   (II) from 5 to 60% by weight of at least one viscosity-reducing additive comprising the reaction products of 1 mol of a monohydric $C_8$- to $C_{22}$-alcohol with from 2 to 70 mol of ethylene oxide and from 0 to 30 mol of propylene oxide, and
   (III) from 0 to 40% by weight of water as homogenizing or phase-stabilizing additive said weight percentages being based on the mixture.

5. The low viscosity mixtures as claimed in claim 1, wherein (I) is present in an amount of from 50 to 90% by weight, and (II) is present in an amount of from 5 to 48% by weight.

6. The low viscosity mixture as claimed in claim 1, wherein (III) is present in an amount of 0%.

7. The low viscosity mixture as claimed in claim 4, wherein (III) is present in an amount of 0%.

8. A process for incorporating polymers in the manufacture of detergents and cleaners, wherein low-viscosity mixtures as claimed in claim 1 are used.

9. A low viscosity mixture of
   (I) from 40 to 97.5% by weight of amphiphilic nonionic graft copolymers comprising, in copolymerized form,
      (a) at least 20% by weight of polyvinylpyrrolidone units as hydrophilic part of the molecule nd
      (b) at least 40% by weight of vinyl ester and/or (meth) acrylic ester units as hydrophobic part of the molecule, and
   (II) from 2.5 to 60% by weight of at least one viscosity-reducing additive selected from the group consisting of polyalkylene glycols, alkoxylated alcohols, alkoxylated alkylphenols, alkoxylated amines and hydroxy compounds having from 1 to 4 OH groups and from 2 to 10 carbon atoms, the molecular mass $M_N$ of the polymers in each case being not more than 2500, and
   (III) from 0 to 40% by weight of homogenizing or phase-stabilizing additives selected from the group consisting of
      (a) water,
      (b) monobasic and dibasic carboxylic acids having from 8 to 25 carbon atoms, fatty alcohol sulfates, fatty alcohol sulfonates, alkylbenzenesulfonates, sulfonation and/or sulfation products of alkoxylated alcohols having from 8 to 22 carbon atoms or alkylphenols, alkyl(poly) glucosides having from 1 to 20 carbon atoms in the alkyl group, mono-, oligo- and polysaccharides and the oxidation or reduction produce thereof, and
      (c) mixtures of (a) and (b) in a weight ratio of from 100:1 to 20:80, said weight percentages being based on the mixture.

* * * * *